United States Patent [19]

Takarabe et al.

[11] Patent Number: 4,708,792

[45] Date of Patent: Nov. 24, 1987

[54] FILTER MEDIUM

[75] Inventors: Takashi Takarabe, 68-2, 2-chome, Mutsugawa, Minami-ku, Kanagawa-ken; Yoshihiko Ueda, 1-13, 3 chome, Sakurabatake, Yamaguchi-shi, Yamaguchi-ken, both of Japan

[73] Assignees: Takara Kogyo Co., Ltd., Tokyo; Takashi Takarabe, Kanagawa; Yoshihiko Ueda, Yamaguchi, all of Japan

[21] Appl. No.: 854,413

[22] Filed: Apr. 21, 1986

[30] Foreign Application Priority Data

Oct. 17, 1985 [JP] Japan .................................. 60-229914
Oct. 17, 1985 [JP] Japan .................................. 60-229915
Oct. 17, 1985 [JP] Japan .................................. 60-229916
Oct. 17, 1985 [JP] Japan .................................. 60-229917

[51] Int. Cl.$^4$ .............................................. C02F 3/04
[52] U.S. Cl. .................................... 210/150; 210/505; 210/508
[58] Field of Search ............... 210/150, 151, 505, 508, 210/617, 509

[56] References Cited

U.S. PATENT DOCUMENTS 3,347,381 10/1967 Minch et al. .......................... 210/150
4,165,281 8/1979 Kuriyama et al. ................... 210/150
4,451,362 5/1984 Spelsberg ............................. 210/150
4,461,708 7/1984 Hakulinen et al. .................. 210/150

FOREIGN PATENT DOCUMENTS 2702043 7/1977 Fed. Rep. of Germany ...... 210/150
2726167 12/1977 Fed. Rep. of Germany ...... 210/150
53-18471 2/1978 Japan .................................... 210/150

Primary Examiner—Benoît Castel
Attorney, Agent, or Firm—Wenderoth, Lind & Ponack

[57] ABSTRACT

A filter medium comprising first and second filter mediums joined together. The first filter medium provides relatively large voids and has high porosity, while the second filter medium provides relatively small voids and has low porosity. Raw water is mainly introduced into the first filter medium, and water branching therefrom flows through the second filter medium, at which biological filtering is conducted by aerobic microorganisms breeding therein.

5 Claims, 12 Drawing Figures

FILTER MEDIUM

BACKGROUND OF THE INVENTION

The present invention relates to a filter medium for use in raw water filter.

Generally, filtering of raw water is determined in light of the nature of the raw water, amount of organic material contained in the raw water, processing amount thereof, purity of the raw water, processing amount per unit time, etc. These factors are dependent upon filtering resistivity of a filter medium for use in a filter device, so that the characteristic of the filter medium is one of the important parameters for the filtering operation. Further, in case the filter medium is formed of a layer of particles, filtering resistivity is generally represented by the following equation:

$$ho = K \cdot \frac{\mu \cdot u \cdot L}{\rho \cdot g \cdot d^2} \cdot \frac{(1-\epsilon)^2}{\epsilon^3} \qquad (1)$$

in which,
- ho: filtering resistivity (water head m)
- K: constant
- u: filtering velocity (m/S)
- L: thickness of filter medium bed (m)
- $\mu$: viscosity of water (kg/m·S)
- $\rho$: density of water (kg/m$^3$)
- d: particulate size (m) of filter medium
- g: acceleration of gravity (m/S$^2$)
- $\epsilon$: porosity of filter medium bed Incidentally, the equation (1) concerns the filter medium formed of a particulate bed. However, a mutual relationship also exists between each of the factors in equation (1) in case the filter medium is formed of filtering fabric, in which case partial modification of the equation is necessary.

Figure 11:
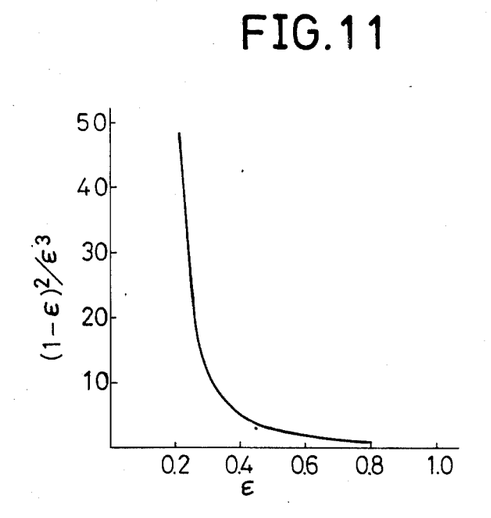
FIG. 11 is a graphical representation showing the relationship between the porosity and the porosity function.

In the equation, the function of porosity $(1-\epsilon)^2/\epsilon^3$ exhibits the tendency of filtering resistance. The relationship between the porosity and the function of porosity is by a graph shown in FIG. 11. According to the graph, it is understood that if the porosity $\epsilon$ is decreased, the function of porosity $(1-\epsilon)^2/\epsilon^3$ is abruptly increased, so that the filtering resistivity ho is also rapidly increased. As a result, the filter medium must be cleaned. That is, if the porosity $\epsilon$ is lower than a predetermined level, the filtering resistivity is increased exponentially, and as a result, the filter medium does not provide filterability. Further, in any kind of filter medium, the porosity $\epsilon$ is necessarily in the range of $0 < \epsilon < 1$. Therefore, the porosity is proximate to 1 in order to reduce filtering resistance. However, as the porosity increases to 1, materials such as organic materials to be trapped by the filter medium pass therethrough, to degrade the filtering function of the filtering device. Therefore, according to the conventional filtering device, porosity of the filter medium is lowered, thereby decreasing the processing amount per single circulation, and repeated filtering and cleaning of the filter medium is necessary so as to solve these conventional drawbacks.

Moreover, in order to filter water which exists in nature, the, nature of the water is closely related to the filtering condition. Contamination of water may be distinguished by the following four grades:

(a) where there is low content of dissolved oxygen, organic materials and muds are mostly oxidized and constituents are of inorganic material, and particularly, there is a small amount of colon bacilli, and further, there are small plankton and algae, and furthermore there are green algae, red algae, larvae of insects, etc.

(b) where there is high content of dissolved oxygen, oxidation of organic materials occurs, and an ammonia compound exists which is a product of the oxidation decomposition of the organic materials, and therefore, there are many kinds of a living thing such as diatom, green algae, conjugation algae, colon bacillus, Suctoria, bright moss, and fish.

(c) where organic material is decomposed, and black mud disappears, there are a large number of bacteria and algae, and further colon bacillus and Suctoria alive so that fish can inhabit in the water.

(d) where there exists a large content of organic material and oxidation decomposition occurs continuously, therefore mud color is black and further fish and algae can not inhabit due to a large amount of decomposed products of organic material.

As mentioned above, state of water is changeable due to amount of incoming organic material, water quality, and water condition. In case of filtering of water, if the water contains dissolved oxygen to allow existence of aerobic bacteria therein, algae and organic materials trapped by the filter are decomposed by the aerobic bacteria, whereas if water contains less dissolved oxygen, there is an anaerobic bacterial effect on the trapped materials. In both cases, continuous operation for a long period of time is required to conduct the decomposition on the filter medium by these bacteria.

During filtering operation, voids of the filter medium are closed within relatively short period of time, to require cleaning of the filter. Cleaning per se is troublesome and takes a long time.

In view of the above, according to the conventional filtering, the filter medium has low porosity in order to enhance trapping effect of the organic materials. Therefore, if the filtering resistance is increased due to adhesion of the organic material to the surface of the filter medium, the filter medium was subjected to cleaning at relatively short time intervals. Therefore, such filter medium is not capable of continuous filtering for a long period of time.

SUMMARY OF THE INVENTION

It is therefore an object of the present invention to overcome the above-mentioned drawbacks and to provide an improved filter medium.

Another object of the present invention is to provide such filter device capable of producing sufficient filtering efficiency irrespective of non-cleaning of the filter at long time intervals.

These and other objects of the present invention will be attained by providing a filter medium comprising first and second filter mediums. The first filter medium provides large voids to reduce flow-resistivity, whereas the second filter medium provides small voids to increase flow-resistivity. The first and second filter mediums are used together. Raw water passes through the first filter medium as a main or primary flow, and minute flows branching from the main flow pass through the second filter medium. The second filter medium contains therein large number of aerobic microorganisms such as aerobic bacteria, to thereby decompose organic materials clogging the filter medium. As a result, the filter medium performs both physical and biological filtering.

DETAILED DESCRIPTION OF THE PREFERRED EMBODIMENTS

Figure 1:
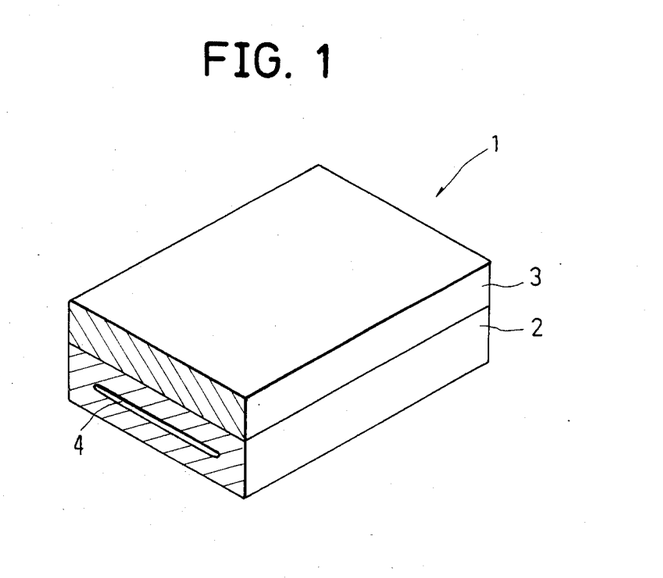
FIG. 1 is a perspective view showing a filter medium according to an embodiment of the present invention.

Embodiments of the present invention will be described with reference to accompanying drawings. FIG. 1 is a perspective view showing one embodiment of this invention. A filter medium 1 is shown as one piece for convenience. It goes without saying that optimum shape of the filter medium is provided to be capable of application to a filtering device. The filter medium 1 includes a first filter medium 2 and a second filter medium 3. The first filter medium 2 provides voids large in size and having high porosity. On the other hand, the second filter medium 3 provides voids smaller in size than the voids of the first filter medium, and provides low porosity. With these constructional differences between the first and second filter mediums and the difference in pressure loss attendant thereto, filter medium 1 permits raw water to pass through the first filter medium 2 as a main flow, and to pass through the second filter medium 3 as branch flows of the main flow. Further, the first filter medium 2 allowing the raw water to pass therethrough as the main flow, also functions to supply oxygen to the second filter medium 3. On the other hand, the second filter medium 3 which allows the raw water to pass therethrough as minute branch flows functions to filter the raw water as well as to receive oxygen from the first filter medium 2 and to render aerobic microorganisms such as aerobic bacteria to breed in great amount, to thereby decompose organic material trapped by the second filter medium. The decomposed organic material is discharged outside of the filter device mainly by the main flow passing through the first filter medium 2. Further, the aerobic microorganisms largely breeding in the second filter medium 3 also function to filter living things contained in the raw water. Therefore, the filter medium in accordance with the present invention performs biological filtering as well as physical filtering by means of the first and second filter mediums 2 and 3. The filter medium 1 of the present invention provides sufficient filtering efficiency and keeps its efficiency for a long duration of time without cleaning of the medium for a long time interval, since the second filter medium 3 permits a great number of aerobic microorganism to breed therein.

Figure 2A:
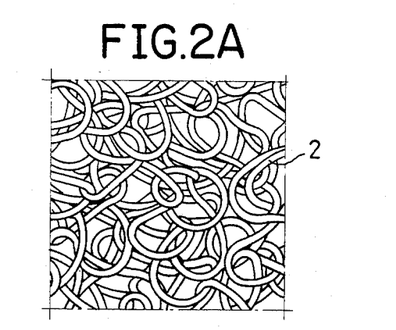
FIG. 2A is a partly enlarged view of a first filter medium of the present invention.
Figure 2B:
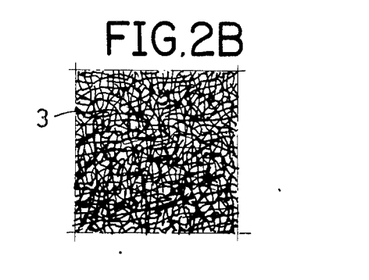
FIG. 2B is a partly enlarged view of a second filter medium of the present invention.

The first and second filter mediums 2 and 3 are formed of fibrous material having water resistance, for example, synthetic resin such as polyethylene, polypropylene, polyvinyl chloride and polyester, synthetic rubber, or inorganic material such as glass fibers. Such materials are partly joined, fused or bonded in vertical and transverse directions to provide a plurality of voids having non-uniform shape with one another. The fibrous material has a diameter ranging from about 0.01 to 3 mm. FIG. 2A is a partly enlarged schematic view of the first filter medium 2 wherein voids are formed by the mutually interwound fibers. FIG. 2B is a partly enlarged schematic view showing the second filter medium 3. As shown in FIG. 1, the first filter medium 2 is formed with a fluid passage 4 centrally positioned and in the form of an elongated slot in cross-section extending in the longitudinal direction of the first filter medium 2. This fluid passage 4 is adapted to easily obtain the main flow in the first filter medium 2 at relatively high flow-velocity by reducing the flow dynamic resistance. Further, the second filter medium 3 provides voids capable of generating pressure loss by, in average, 1.4 times as large as that generated in the first filter medium 2 with respect to the identical water flow amount per unit length. The first filter medium 2 and the second filter medium 3 have 5 to 50 kg/m$^3$ and 25 to 150 kg/m$^3$ in weight, respectively.

Figure 3:
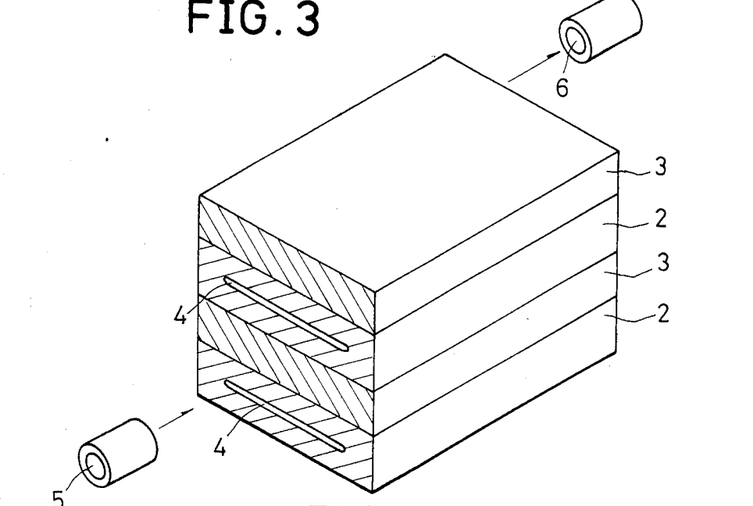
FIG. 3 is an explanatory illustration showing a fluid flow when water passes through the filter medium according to the present invention.

FIG. 3 is an explanatory illustration showing a fluid flow when water flows through the filter medium 1. The first filter mediums 2 having high porosity and the second filter mediums 3 having low porosity are arranged alternately in vertical or horizontal direction to provide the composite filter medium 1. With this structure a fluid inlet 5 is provided at one side of the filter medium and a fluid outlet 6 is provided at the side opposite the fluid inlet to thus provide a filtering device. In filtering operation using the filtering device, contaminated raw water is supplied to the first filter medium 2 having high porosity through the fluid inlet 5. In this case, most of the raw water is introduced as a main flow, into the fluid outlet 6 by way of the fluid passage 4 having low flow resistivity and portions adjacent thereto. Further, a part of the raw water passes through large voids and neighbouring small voids in the second filter medium 3 and is discharged through the fluid outlet 6.

Figure 4:
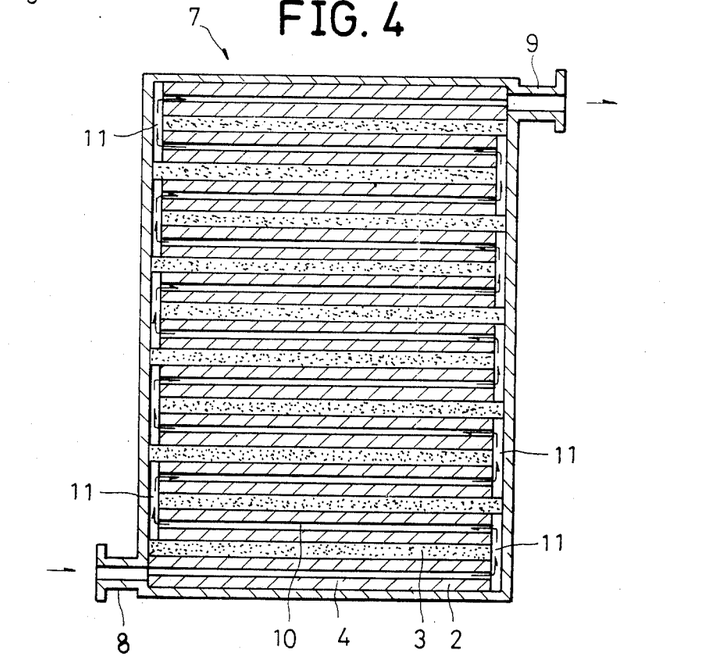
FIGS. 4 to 6 are vertical cross-sectional views showing circulating filtering devices according to first, second and third embodiments of the present invention in which the filtering medium of the present invention is employed.

FIG. 4 is a circulating filtering device according to a first embodiment of the present invention which employs the filter medium of the present invention. This filter device is applied to filter pond water, but the application is not limited thereto. The filter device is provided with a casing 7 in the form of a short cylinder, the casing 7 is provided with a fluid inlet 8 and a fluid outlet 9 at its lower and upper portions, respectively. Further, inside the casing 7, sheet-like filter mediums 1 according to the present invention are alternately stacked vertically. Furthermore, within the casing 7, communication passages 11 are formed at right and left positions alternately so as to provide direct fluid communication between main fluid passages 10 formed in the first filter mediums 2 without communication with the second filter mediums 3. Accordingly, raw water flows through the main fluid passages 10 and communication passages 11 as a main flow. As a result, raw water as the main flow passes upwardly in zig-zag fluid passage defined by the main fluid and communication passages 10 and 11.

Operation in accordance with the filter device will be described.

Upon raw water supply to the interior of the casing 7 through the fluid inlet 8 by a pump (not shown), most of the raw water passes in zig-zag passageway as the main flow along the main fluid passage 10 in the first filter medium 2 and the communication passage 11, and is discharged outside from the fluid outlet 9. On the other hand, in the second filter medium 3, raw water soaks therein as branch flows from the main flow, since void size and the porosity of the second filter medium 3 are smaller than and lower than those of the first filter medium 2. The main flow passing through the main fluid passage 10 of the first filter medium 2 and the communication passage 11 supplies oxygen to the second filter medium 3, so that a large amount of aerobic microorganisms breed in the second filter medium 3. The second filter medium 3 on one hand physically filters the raw water, and on the other hand, decomposes the organic materials trapped in the second filter medium 3 by the aerobic microorganisms breeding therein.

Thus decomposed organic materials are mostly transferred outside the filter device by way of the main fluid passage 10 in the first filter device 2 and the communication passage 11. Further, within the second filter medium 3, filtering of living things in the raw water is carried out by the aerobic microorganisms breeding in the filter medium 3 in a large amount.

The above-mentioned process is repeatedly performed at the entire region of the filter medium. Therefore, filtering efficiency of the filter device in accordance with the first embodiment can be maintained for a long period of time without cleaning the filter medium for long time intervals. Further, flow amount of the raw water passing through the filter device can be maintained at approximately constant level.

Figure 5:
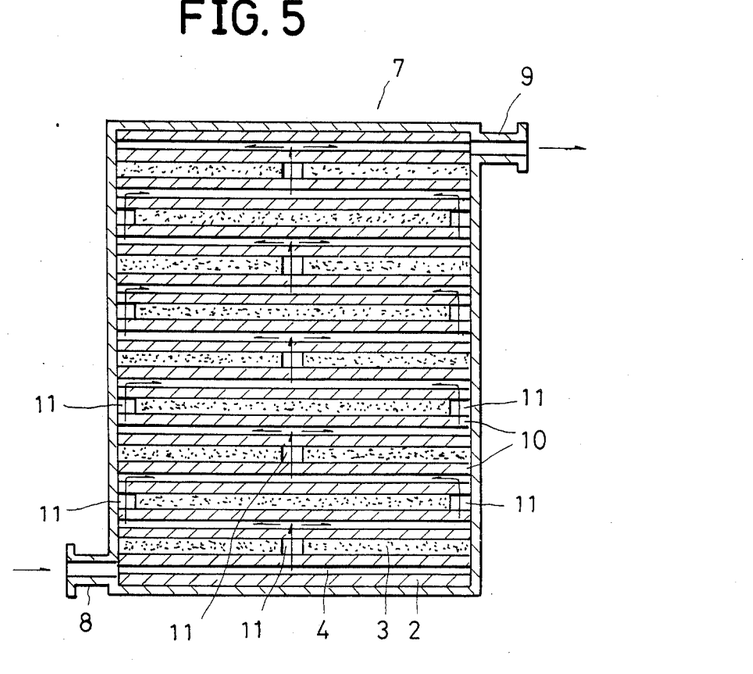

Next, a filtering device according to a second embodiment employing the filter medium 1 of this invention will be described with reference to FIG. 5.

The second embodiment provides the structure substantially similar to that of the first embodiment shown in FIG. 4. However, the arrangement of the communication passage 11 is different from that of the first embodiment. That is, the communication passage 11 is formed at a central portion of the second filter medium 3 and at both ends of the adjacent second filter medium 3. This positional arrangement is alternately made. As a result, in the filter device according to the second embodiment, main raw water flow flows upwardly along symmetrically zig-zag passages. The second filter device is similar to the first filter device shown in FIG. 4 other than the communication passage, and therefore, further description is eliminated. In FIG. 5, like parts and components are designated by the same reference numerals as those shown in FIG. 4.

Figure 6:
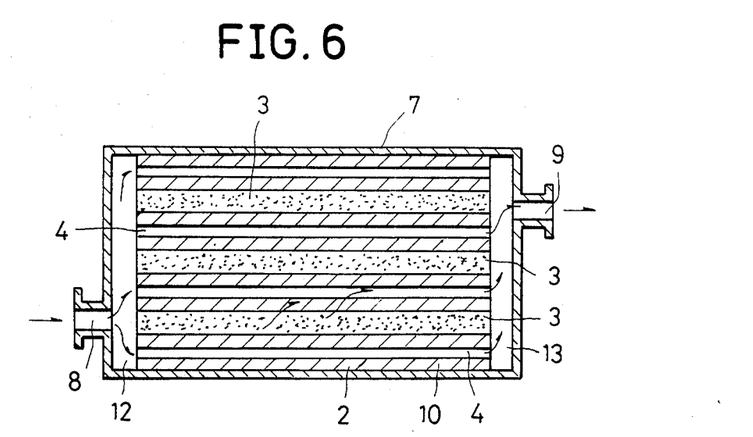

FIG. 6 is a filtering device according to a third embodiment which empoys the filter medium 1 of the present invention. The third embodiment is provided with a fluid inlet 8 positioned at one lower side of a casing 7 and a fluid outlet 9 positioned at the other upper side thereof. Inside the casing 7, a raw water chamber 12 and a filtered water chamber 13 are provided at the sides of fluid inlet 8 and fluid outlet 9, respectively. Between these chambers 12 and 13, filter mediums 1 according to the present invention are alternately stacked in vertical direction. Futher, a plurality of main fluid passages 10 in the first filter mediums 2 similar to those in the first and second embodiments extend in horizontal direction. As a result, a plurality of main flows of the raw water flow in horizontal direction. Further, minute branch flows pass through the second filter medium 3. Other construction of the third filter device is the same as that of the first and second filter devices. Components shown in FIG. 6 corresponding to those shown in FIG. 4 are alotted with the same reference numerals for eliminating repetition of the description.

Figure 7:
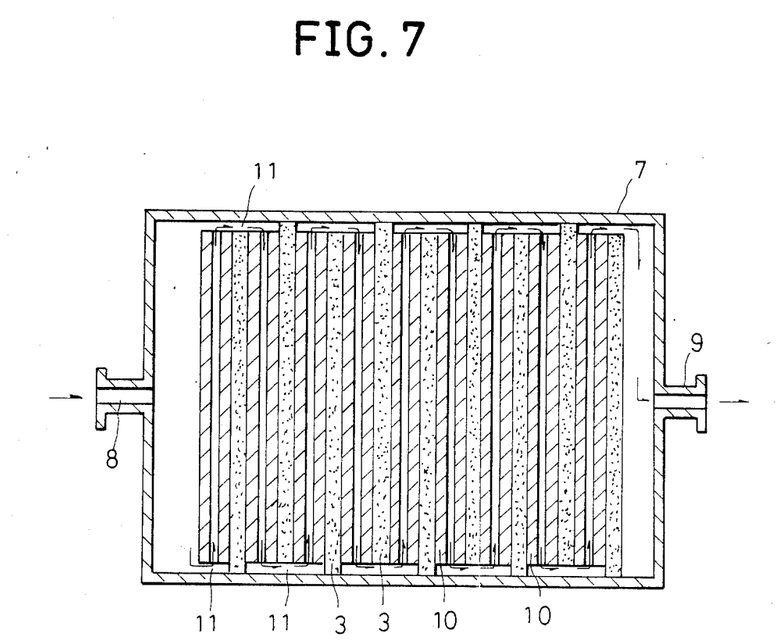
FIGS. 7 and 8 are transverse cross-sectional views showing circulating filtering devices according to forth and fifth embodiments of the present invention in which the filtering medium of the present invention is used.

FIG. 7 is a transverse cross-sectional view showing a circulating filtering device according to a fourth embodiment which employs a filter medium of the present invention. The fourth embodiment provides a casing 7 having rectangular cross-section. In the casing 7, fluid inlet 8 and fluid outlet 9 are provided at front and rear portions thereof, respectively. Within the casing 7, sheet-like filter mediums 1 according to the present invention are alternately arranged in horizontal direction. Further, within the casing 7, communication passages 11 are formed at right and left extreme ends thereof alternately so as to provide direct fluid communication between neighbouring main fuid passages 10 each formed in the respective first filter mediums 2. Therefore, raw water flows, as a main flow, through the main fluid passages 10 and the communication passages 11 connected thereto. As a result, raw water, as a main flow, passes frontwardly along zig-zag passages defined by the main fluid passages 10 and the communicating passages 11. Further, minute branch flows pass through the second filter mediums 3 from the main flow. Other construction is similar to the foregoing embodiments. In FIG. 7, like parts and components are designated by the same reference numerals as those shown in FIG. 4 to eliminate repetition.

Figure 8:
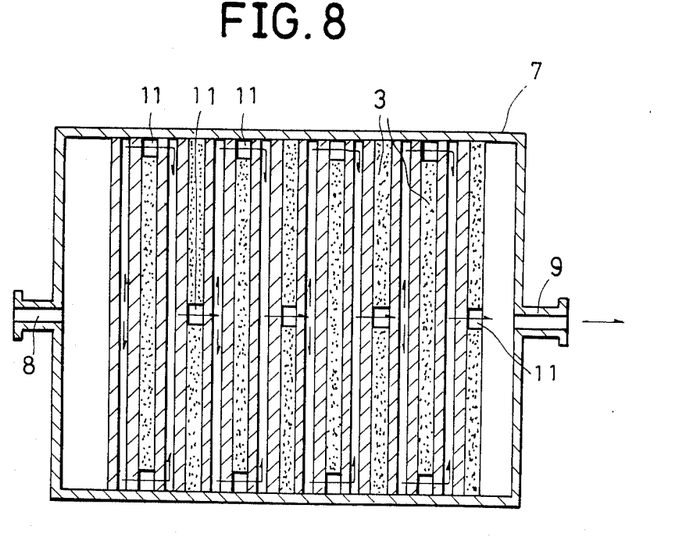

FIG. 8 is a transverse cross-sectional view showing a circulating filtering device according to a fifth embodiment wherein the filter medium 1 of the present invention is used as one of the constituents. A casing 7 of this embodiment is the same as that of the fourth embodiment. Further, sheet-like filter mediums 1 are alternately arranged in a horizontal direction similar to the fourth embodiment. Furthermore, communication passages 11 are alternately provided at right and left ends of the casing to connect neighbouring main flow passages 10 as in the fourth embodiment. However, in the fifth embodiment, additional communication passages 11 are formed at the central portion of the respective second filter mediums 3. As a result, raw water flows along dual zig-zag passageways defined by the main and communication fluid passages 10 and 11, and further, minute branch flows pass through the second filter mediums 3. The construction other than the above is the same as that of the first embodiment, and therefore, further description is omitted by alloting the same reference numerals with respect to the same components between the embodiments shown in FIGS. 4 and 8.

Figure 9:
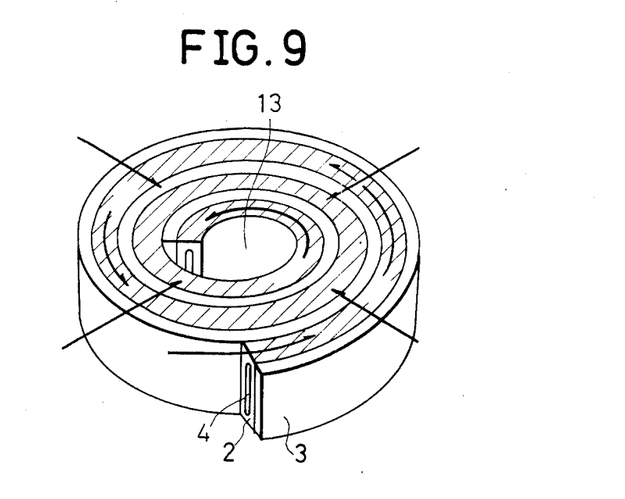
FIG. 9 is a perspective view showing a filter medium according to an another embodiment of the present invention.

FIG. 9 is a perspective view showing another embodiment of a filter medium according to the present invention. In this filter medium 1, longitudinally ajoining first and second filter mediums 2 and 3 are wound in scroll shape, and a hole 13 is formed at the scroll center of the filter medium 1. Further, a first filter medium 2 is provided internally with respect to a second filter medium 3. According to the filter medium 1, raw water is introduced from the outside toward the hole 13. The supplied raw water mostly passes through swirl passage of the first filter medium 2 as a main flow. Further, the supplied raw water also passes through the filter medium in radial direction thereof. Part of the main flow also passes in the radial direction through the filter medium as branch flows. The construction other than the above is the same as that shown in FIG. 1, so that further description is eliminated.

Figure 10:
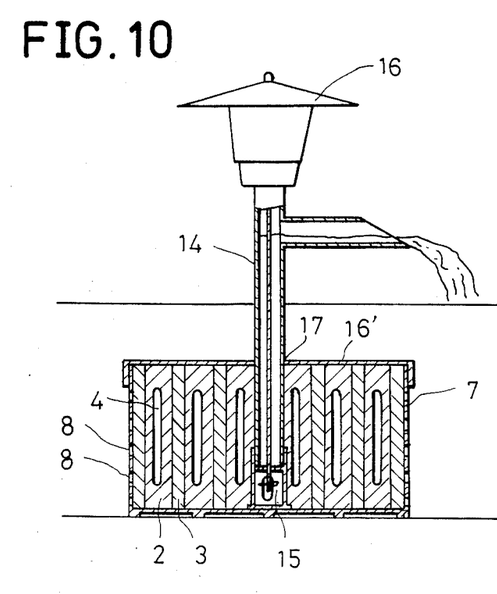
FIG. 10 is a cross-sectional view showing a complete example of a circulating filtering device employing the filter medium of the present invention.

Next, a filtering device incorporating therein the filter medium 1 shown in FIG. 9 will be described with reference to FIG. 10. The filtering device shown in FIG. 10 is installed in the pond for recirculatingly filtering the pond water. The filtering device is provided with a cup-spaced casing 7 having cylindrical shape which is installed on a pond bottom. A plurality of fluid inlets 8 are formed at a peripheral wall of the casing 7. A filtered water pipe 14 extends upwardly at the central portion of the casing, the pipe being provided detachably with respect to the casing. A water suction pump 15 is disposed in the interior space of the filtered water pipe 14, whose upper end portion is provided with a garden lamp 16. Between the inner peripheral surface of the casing 7 and the outer peripheral surface of the pipe 14, the filter medium including mutually ajoining first and second filter mediums 2 and 3 wound in scroll form is removably interposed. An upper lid member 16 is detachably assembled on an opening portion of the casing 7. The lid member 16 is formed with a center hole 17 adapted to allow the filtered water pipe 14 to pass therethrough.

Operation of this filtering device will be described.

Upon actuation of the water suction pump 15, pond water is introduced into the interior of the casing 7 through a plurality of fluid inlets 8. The introduced pond water mostly passes along the scroll passageway of the first filter medium 2 as a main flow, and reaches the filtered water pipe 14. The water is recirculated into the pond through the filtered water pipe 14. Further, pond water entered into the casing 7 also passes through the second filter medium 3 in radial direction of the casing 7. Among the radially inward flows, pond water branching from the main flow is included as minute branch flows. Such branch flows also reach the filtered water pipe 14 and are discharged into the pond therethrough. During the recirculation filtering process for pond water treatment, filtering and decomposition of the organic materials are carried out simultaneously as in the case of the filter medium 1 described with reference to FIG. 1. Therefore, attendant explanation will be eliminated.

According to the foregoing embodiments, the first and second filter mediums 2 and 3 are simply combined together, or joined together. However, the boundary surface between the first and second filter mediums can be fuse-bonded or adhered together. Further, in the embodiments mentioned above, the first filter medium 2 is formed with central fluid passage 4. However, the first filter medium without the passage 4 can also be used in the present invention.

In view of the above, the filter medium of the present invention thus constructed provides excellent filterability, and can maintain filtering efficiency for a long time irrespective of non-cleaning at long time intervals, so that the filtering device can sustain continuous operation for long duration. Therefore, time consuming labor for cleaning the filter medium can be obviated.

While the invention has been described in detail with reference to specific embodiments, various changes and modifications can be made therein without departing from the scope and spirit of this invention.

What is claimed is:

1. A combined filter medium comprising a first fibrous filter medium having relatively large voids and a relatively high porosity, and further having a fluid passage formed therein, and a second fibrous filter medium having voids smaller than those of said first filter medium and a porosity lower than that of said first filter medium, said first and second filter mediums being formed of fibrous material of a diameter from 0.01 to 3 mm and having a water-resistant property, and said second filter medium being capable of generating a pressure loss which is at least 1.4 times as large as the pressure loss generated in the first filter medium with respect to an identical water flow amount per unit length, said combined filter medium filtering raw water by receiving a main flow of the raw water in said fluid passage, flowing the main flow through said first filter medium because of a difference in pressure loss between said first and second filter mediums, thus forming branch flows of water, and flowing the branch flows through said second filter medium, and wherein said first filter medium supplies oxygen to said second filter medium in which aerobic microorganisms breed, whereby trapped organic material is decomposed by the microorganisms.

2. A filter medium as claimed in claim 1, wherein a plurality of said first and second filter mediums are alternately joined together.

3. A filter medium as claimed in claim 1, wherein said first and second filter mediums are wound together in scroll shape.

4. A filter medium as claimed in claim 1, wherein said first and second filter mediums are formed by intersecting fibrous materials.

5. A filter device for filtering water, comprising a container having water inlet and outlet means, and a combined filter medium according to claim 1 within said container.

* * * * *